US009376835B2

(12) United States Patent

Schildwachter et al.

(10) Patent No.: US 9,376,835 B2

(45) Date of Patent: Jun. 28, 2016

(54) MAGNETICALLY MOUNTED DOOR HARDWARE TEMPLATE

(71) Applicants: William Schildwachter, Danbury, CT (US); James S. Lee, Huntersville, NC (US); Ferdinand E. Orbeta, Mount Kisco, NY (US)

(72) Inventors: William Schildwachter, Danbury, CT (US); James S. Lee, Huntersville, NC (US); Ferdinand E. Orbeta, Mount Kisco, NY (US)

(73) Assignee: TRINE ACCESS TECHNOLOGY, INC., Bronx, NY (US)

(*) Notice: Subject to any disclaimer, the term of this patent is extended or adjusted under 35 U.S.C. 154(b) by 67 days.

(21) Appl. No.: 14/449,450

(22) Filed: Aug. 1, 2014

(65) Prior Publication Data

US 2015/0113817 A1 Apr. 30, 2015

Related U.S. Application Data

(60) Provisional application No. 61/896,776, filed on Oct. 29, 2013.

(51) Int. Cl.

*G01B 5/24* (2006.01)
*E05B 17/06* (2006.01)

(52) U.S. Cl.

CPC .................................... *E05B 17/06* (2013.01)

(58) Field of Classification Search

CPC .... E05B 17/06; E04F 21/003; E04F 21/0015; E04F 21/0007; E04F 21/0023; E04F 21/0076; E04F 21/18

USPC ...................................... 33/194, 562, DIG. 1

See application file for complete search history.

(56) References Cited

U.S. PATENT DOCUMENTS

| | | | | | |
|---|---|---|---|---|---|
| 3,526,947 | A * | 9/1970 | Pasek | B25H 7/04 33/562 |
| 3,851,868 | A * | 12/1974 | Lagasse | E04F 21/0015 33/194 |
| 4,538,354 | A | 9/1985 | Smolik | |
| 4,715,125 | A | 12/1987 | Livick | |
| 4,989,313 | A | 2/1991 | Dzurko et al. | |
| 6,138,337 | A * | 10/2000 | Lezuch | E05B 17/06 33/600 |
| 6,279,218 | B1 | 8/2001 | Lezuch et al. | |
| 6,317,996 | B1 | 11/2001 | Myers et al. | |
| 6,390,520 | B1 * | 5/2002 | Holzer | E05B 47/0046 292/341.16 |
| 6,442,853 | B1 * | 9/2002 | Hale | E04F 21/0015 33/194 |
| 6,990,741 | B1 * | 1/2006 | Wells | E04F 21/0015 33/194 |
| 7,003,889 | B1 * | 2/2006 | Luciani | E05B 17/06 33/194 |
| 7,021,684 | B2 * | 4/2006 | Orbeta | E05B 47/0046 292/201 |

(Continued)

FOREIGN PATENT DOCUMENTS

| | | | |
|---|---|---|---|
| EP | 0500197 | A1 | 8/1992 |
| GB | 2236139 | A | 3/1991 |

OTHER PUBLICATIONS

Third Party Submission under 37 CFR 1.290 Concise Description of Relevance for U.S. Appl. No. 14/449,450, filed Aug. 1, 2014.

*Primary Examiner* — Yaritza Guadalupe-McCall

(74) *Attorney, Agent, or Firm* — Norris McLaughlin & Marcus PA

(57) ABSTRACT

A magnetically mounted template for identifying the optimum installation location for a door hardware device. The template has a working element that engages a cooperating door hardware device, for example, a working latch that engages a bolt. The template is particularly suitable for installing electrically operable door hardware devices, such as electric strikes, which require wiring as well as mechanical attachment to a door frame or door.

4 Claims, 3 Drawing Sheets

(56) References Cited

U.S. PATENT DOCUMENTS

| | | | | |
|---|---|---|---|---|
| 7,246,449 | B2 | 7/2007 | Pierson et al. | |
| 8,745,835 | B2 * | 6/2014 | Cutting | E05B 79/02 33/600 |
| 2002/0170189 | A1 * | 11/2002 | Cheatham | E04F 21/0015 33/194 |
| 2003/0005589 | A1 * | 1/2003 | Hale | E04F 21/0015 33/194 |
| 2005/0257389 | A1 * | 11/2005 | Pierson | E05B 17/06 33/194 |
| 2012/0118116 | A1 | 5/2012 | Mulrine | |
| 2012/0255186 | A1 * | 10/2012 | Allen | E06B 1/04 33/194 |
| 2013/0127260 | A1 | 5/2013 | Webb et al. | |
| 2015/0113817 | A1 * | 4/2015 | Schildwachter | E05B 17/06 33/194 |
| 2015/0211241 | A1 * | 7/2015 | Harris | E04F 21/003 33/194 |

* cited by examiner

MAGNETICALLY MOUNTED DOOR HARDWARE TEMPLATE

CROSS-REFERENCE TO RELATED APPLICATIONS

This is a non-provisional application claiming priority of provisional application Ser. No. 61/896,776, filed Oct. 29, 2013.

BACKGROUND OF THE INVENTION

1. Field of the Invention

The invention has to do with means for optimally locating installation sites for door hardware devices on doors and door jambs. More specifically, the invention concerns a magnetic template for identifying mounting locations for affixing surface mounted door hardware devices to steel door jambs, steel doors and other door components to which a magnet will attach. The door hardware devices can include, but are not limited to electric strikes, panic bar locks, door closers and magnetic locks. The template also can be used to identify locations for terminal wire exits.

2. The Related Art

Door hardware devices need to be properly located in coordination with one another in order to permit the proper functioning of a door. When a device is located improperly a door may fail to open or close properly and may not be securely locked. It is important to avoid guessing or trial and error approximations when installing door hardware devices because, for example, the door jamb component needs to be drilled and, in many cases, cut to accommodate the strike. In this example, if the strike is not located properly the first time, more drilling and cutting is needed, potentially damaging the jamb and/or making it aesthetically unacceptable. In extreme cases, the jamb may even need to be replaced.

Automotive manufacturers have addressed this issue by using magnetic devices to align the actual strike as disclosed in U.S. Pat. No. 4,989,313 and U.S. Pat. No. 6,279,218. In these cases, the strike is inserted into the magnetic device and magnetically affixed to the jamb. The magnetic device and strike can then be moved into the proper position before the jamb is drilled or otherwise modified to affix the strike. Then the magnetic device is removed and re-used.

The present invention is an improvement over the prior art because it facilitates the installation of devices which are more complex than simple automotive door strikes. Thus, devices such as electric strikes which require wiring and other installation complexities now can be located properly on a door jamb without the trial and error methodology used in the prior art.

BRIEF SUMMARY OF THE INVENTION

According to the present invention, three-dimensional templates are made in the same size as the door hardware device which is to be mounted on a door component such as a door jamb, a door, a steel plate on a wooden door or wooden door jamb, or the like. Through holes are provided in the template for mounting screws, locating pins, wiring exits and the like. And these through holes are located in the same places as needed for mounting the door hardware device. The templates are magnetized so that they can be movably mounted on a steel door component. After the template is mounted, it is moved to an optimum location for mounting the door hardware device by sliding it to line it up with another device that has been mounted on the door component.

DETAILED DESCRIPTION OF THE INVENTION

Figure 1B:
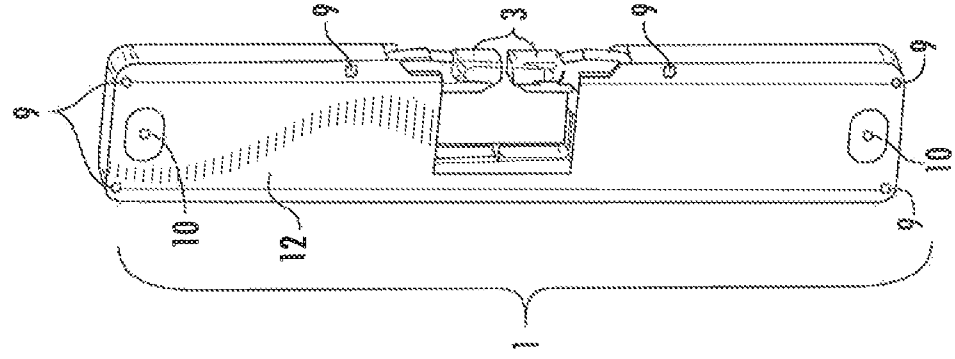
FIG. 1B is a perspective view of an assembled electric strike installation template of the invention.
Figure 1A:
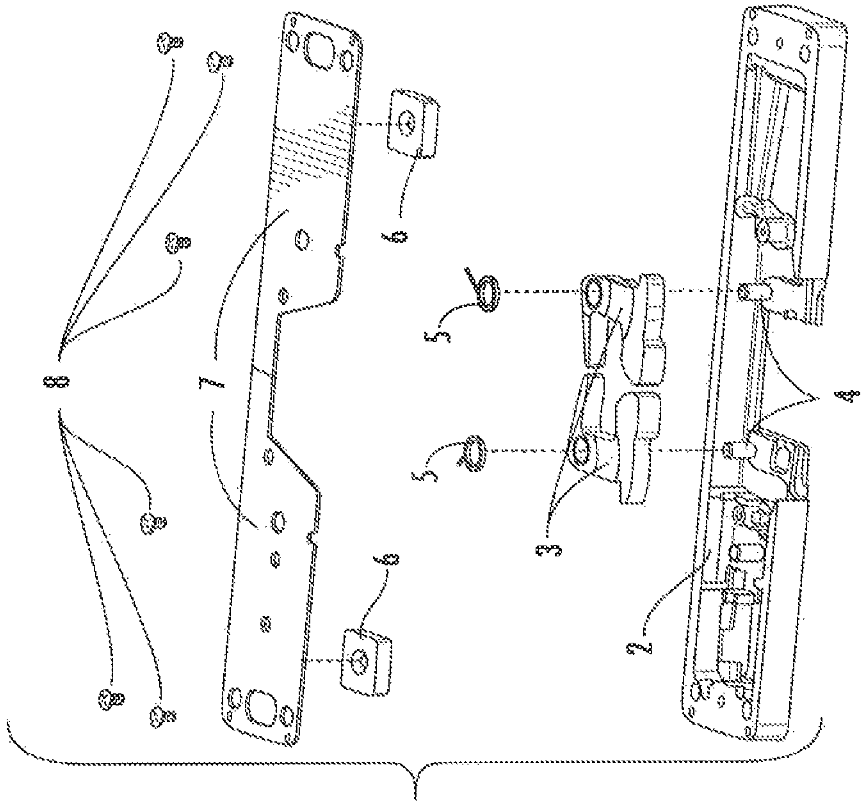
FIG. 1A is an exploded perspective view of an electric strike installation template of the invention.
Figure 2A:
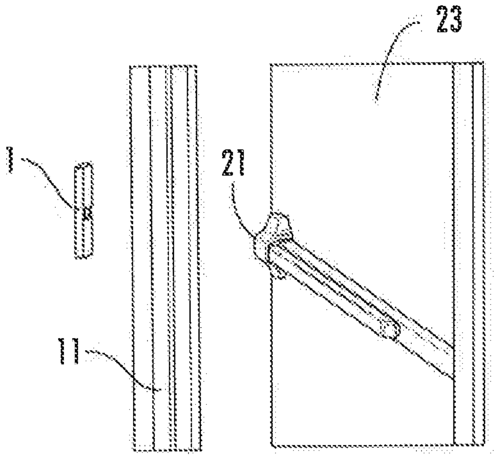
FIGS. 2A-2F illustrate in six steps the method of using the electric strike installation template of the invention.
Figure 2B:
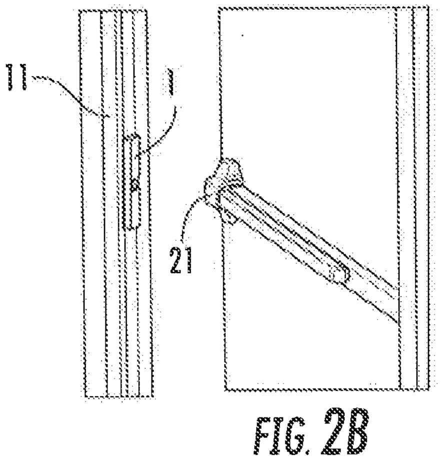
Figure 2C:
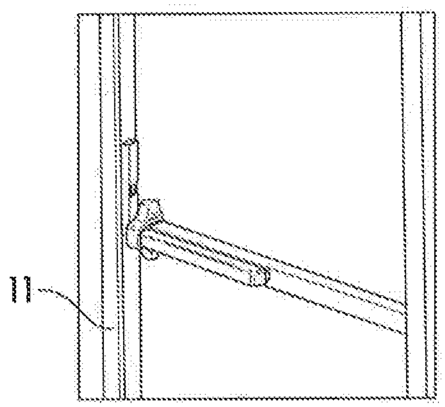
Figure 2D:
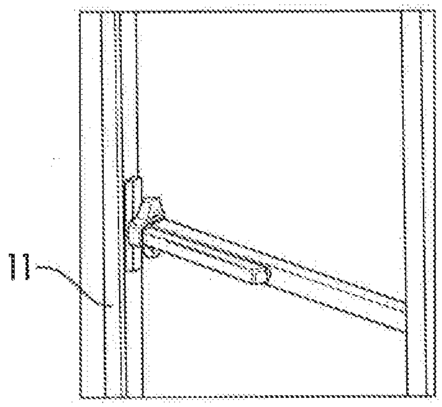
Figure 2E:
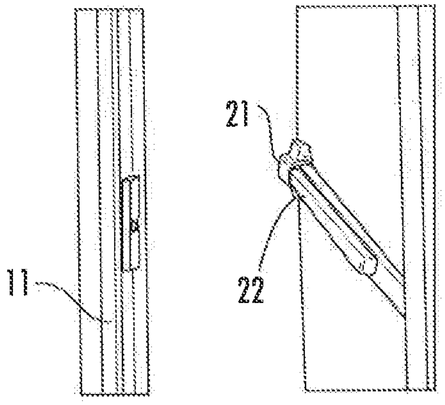
Figure 2F:
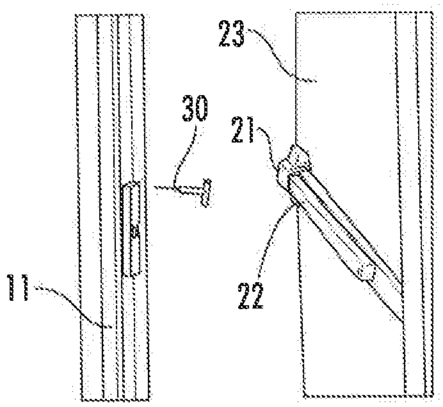

The template illustrated in FIGS. 1A and 1B is three dimensional and it is sized the same as an electric strike. The electric strike is installed after the template is used to identify the optimum location. The illustrated template is used for the electric strike described in U.S. Pat. No. 7,021,684, the disclosure of which is incorporated herein by reference. But other templates can be used for other electric strikes and other door hardware devices as will be apparent to those skilled in the art based on the disclosures herein.

An important feature of the templates of the invention is that they comprise working elements that engage with cooperating door hardware devices. In other words, the working elements simulate the operation of the device which is to be permanently mounted. For example, the template illustrated in FIGS. 1A and 1B is for an electric strike which is to be mounted on a door jamb. The template is the same size and shape as the electric strike and it has movable latches as working elements which receive a bolt of a panic bar as discussed below. All of the templates of the invention have the same or approximately the same dimensions as the hardware device that is to be permanently mounted on a door component.

In the present application the term "sized the same" means having the same or approximately the same dimensions, i.e., the same or approximately the same size and shape. And the term "door component" means a door jamb or a door.

FIG. 1A is an exploded view of template 1 which is illustrated as an assembled unit in FIG. 1B. The template 1 is comprised of a housing 2 in which latches 3 are installed on latch pins 4. Latch springs 5 urge the latches 3 into the closed position illustrated in FIG. 1B. The springs 5 also allow the latches 3 to pivot on pins 4 when a bolt engages the latches 3. Magnets 6 are positioned on back plate 7. And back plate 7 is held in place by screws 8.

Anchor pin positions 9 and mounting screw positions 10 are illustrated in FIG. 1B. These positions are through holes that identify drilling locations as explained below with reference to FIG. 2.

FIGS. 2A-2F illustrate a step-by-step method of using template 1 to locate the optimum position for installation of the electric strike. In the first step, FIG. 2A, template 1 is magnetically mounted on the steel door frame 11. Then, in the second step, FIG. 2B, template 1 is moved vertically along the door frame 11 to an approximate location to receive bolt 21 of panic bar 22 which is mounted on door 23. The door 23 is closed in step (3), FIG. 2C, and the template 1 is moved in step (4), FIG. 2D, to line up optimally with bolt 21. In the fifth step, FIG. 2E, door 23 is opened. Then in step 6, FIG. 2F, a center punch 30 (see FIG. 3) is used to mark drilling locations by actuating the punch through pin positions 9 and screw positions 10. (See FIG. 1B.) The center punch 30 is modified to have an extended shaft which passes through the positions 9 and 10 to mark the drilling locations. The wire exit locations 12 also can be marked with the center punch 30. The door frame 11 then is drilled using drill 40 (see FIG. 3) at the marked locations and the electric strike is mounted on the door frame 11.

Figure 3:
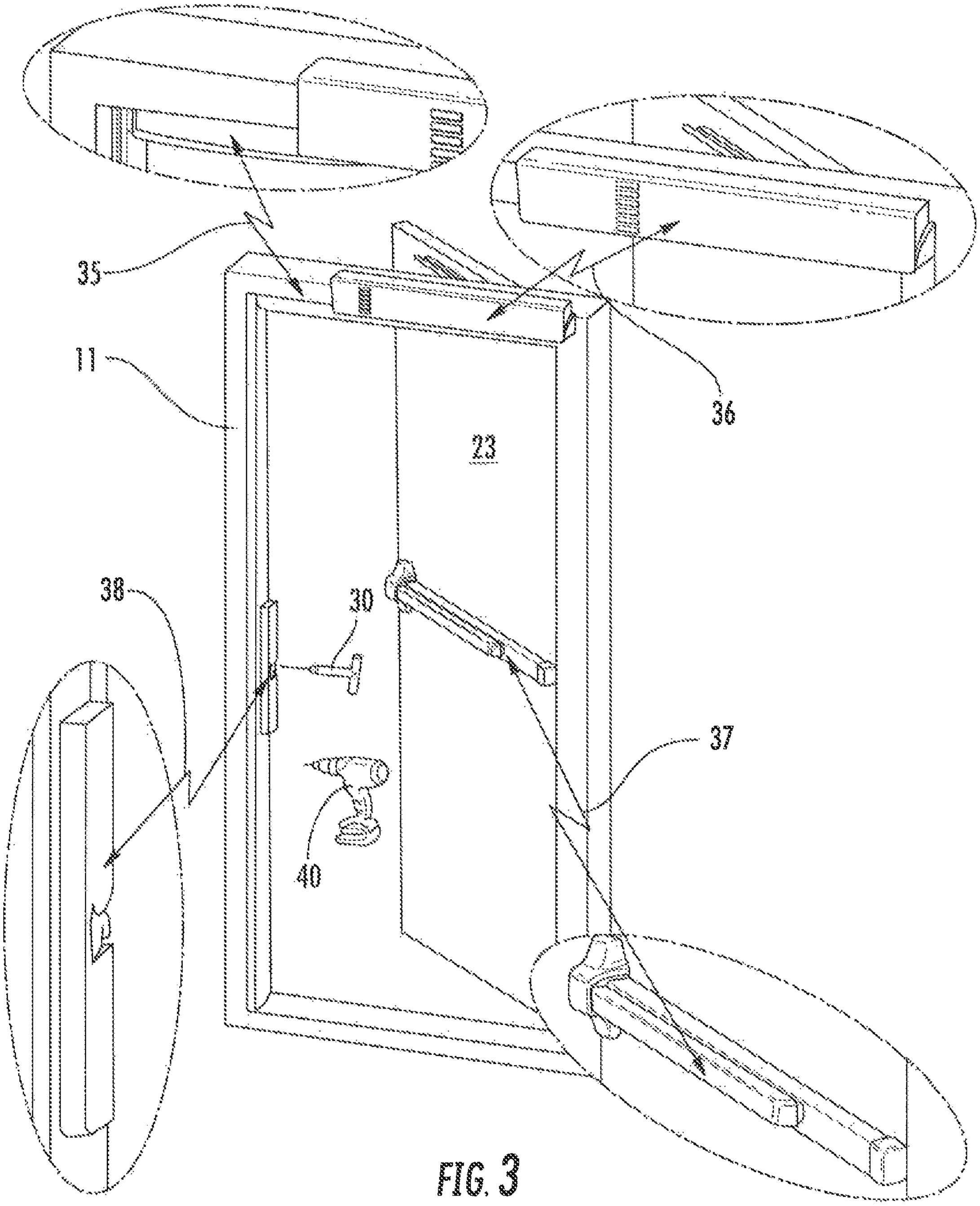
FIG. 3 illustrates four applications of the installation templates of the invention.

FIG. 3 illustrates other door hardware devices for which three-dimensional, magnetically mounted templates can be made and used according to the present invention. The same design principles using working elements, mounting techniques and methods as described above are applied to the manufacture and use of these templates. As examples, templates can be made to identify the optimum mounting location for magnetic lock 35, door closer 36, panic bar lock 37 or other electric strikes 38.

What is claimed is:

1. A three-dimensional magnetic template for identifying mounting locations for affixing a surface mounted door hardware device to a steel door component comprising:

a template which is sized the same as the surface mounted door hardware device and a latch that engages a bolt;

one or more magnets mounted within the template and positioned to hold the template to a steel component of a door jamb or a door;

though holes located in the template in the same positions as anchor pins and mounting screw holes in the door hardware device; and an optional through hole for a wire exit location.

2. A method of using the template of claim 1 to locate the optimum position for installation of a surface mounted door hardware device comprising the sequential steps of magnetically mounting the template to a steel door component;

adjusting the position of the template to a location on the steel door component where the template is lined up with another door hardware device which is affixed to a cooperating door component;

closing the door and moving the template to line it up to an optimum position for installation of the surface mounted door hardware device; and opening the door and marking the mounting location on the door component based on the location of the template.

3. A three-dimensional magnetic template for identifying mounting locations for affixing a surface mounted electric strike to a door jamb having a steel component comprising;

a template which is sized the same as the surface mounted electric strike;

spring loaded latches positioned in the template in locations which cause them to engage a bolt in the same manner as those of the electric strike, the spring loaded latches being actuable by the bolt;

one or more magnets mounted within the template and positioned to hold the template to the steel component of the door jamb;

through holes located in the template in the same positions as anchor pins and mounting screw holes in the electric strike; and an optional through hole for a wire exit location.

4. A method of using the template of claim 3 to locate the optimum position for installation of a surface mounted electric strike comprising the sequential steps of magnetically mounting the template to a door jamb having a steel component;

adjusting the position of the template to a location on the door jamb where the template can receive a bolt which is affixed to a door;

closing the door and moving the template to line it up to an optimum position with the bolt; and opening the door and marking the mounting locations on the door jamb based on the location of the template.

* * * * *